United States Patent Office 3,031,146
Patented Apr. 24, 1962

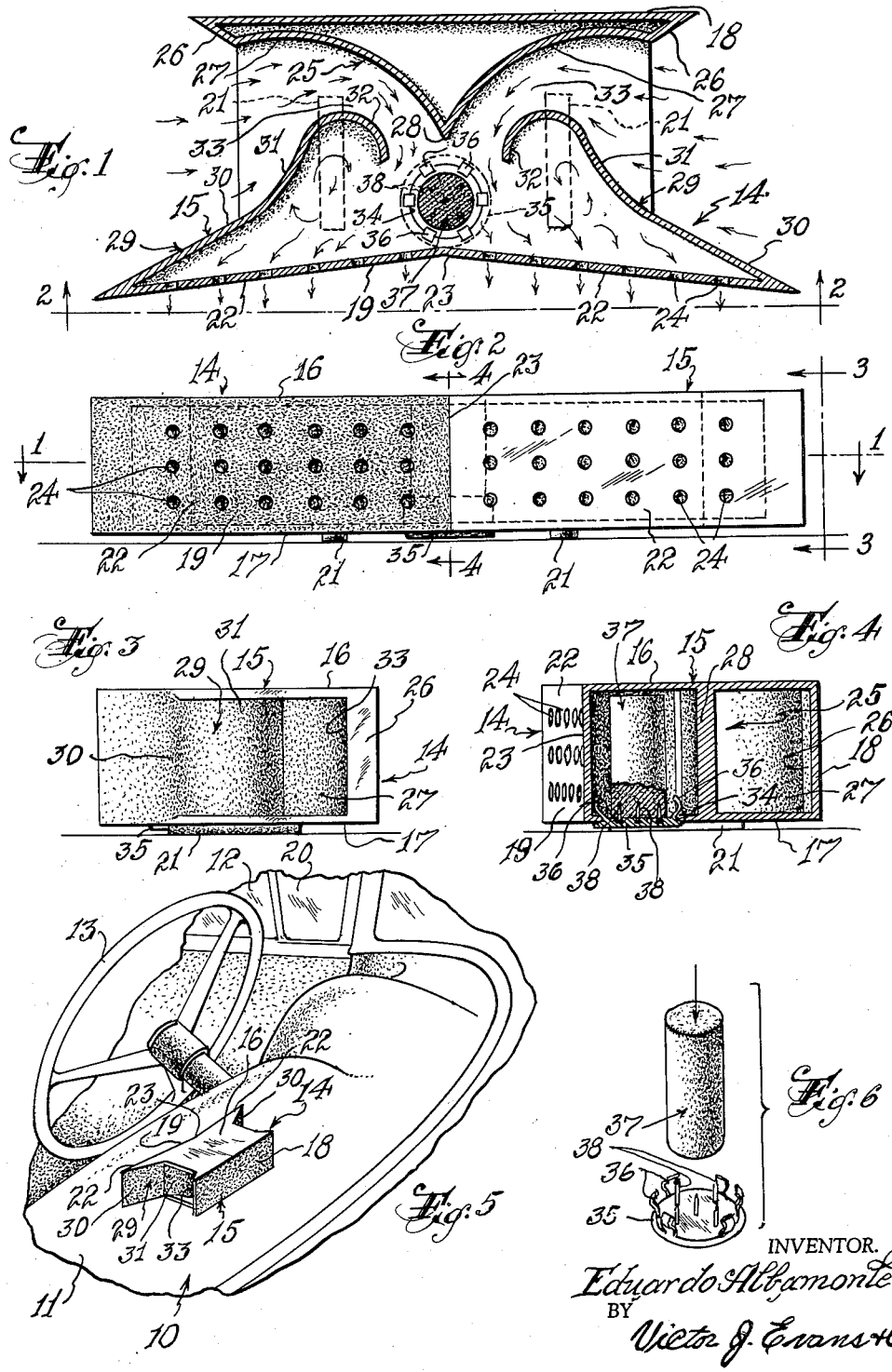

3,031,146
DEODORIZER
Eduardo Albamonte, 551 W. 170th St., Apt. 37,
New York, N.Y.
Filed Dec. 20, 1960, Ser. No. 77,103
1 Claim. (Cl. 239—57)

This invention relates to a deodorizer, and more particularly to a deodorizer for use in a vehicle such as an automobile.

The primary object of the invention is to provide a deodorizer which is adapted to be mounted in a convenient location such as on the dash panel of an automobile or other motor vehicles, whereby air which enters the interior of the vehicle through the usual vent windows at the front side portions of the vehicle, will be able to flow into the housing and this air will be guided or directed into contact with a cartridge such as a scented cartridge so that the air will be perfumed or otherwise acted on and wherein the air which flows out from the housing will thus be pleasant smelling and generally free of obnoxious odors or the like.

A further object of the invention is to provide a deodorizer of the type stated which is adapted to be used for counteracting odors such as tobacco smoke, gasoline, food odors or the like which are often found in automobiles, and wherein the deodorizer of the present invention is adapted to be held in place by magnets, the deodorizer including a cartridge which may be provided with a perfume like substance so that the air from the deodorizer which enters the vehicle will be pleasantly scented, and wherein the deodorizer includes a cartridge that can be removed and replaced when desired.

Still another object of the invention is to provide such a deodorizer that is economical to manufacture and efficient in operation and which is rugged in structure and foolproof in use.

These and other objects of the invention will become apparent from a reading of the following specification and claim, together with the accompanying drawing, wherein like parts are referred to and indicated by like reference characters and wherein:

FIGURE 1 is a vertical sectional view taken through the deodorizer of the present invention and taken generally on the line 1—1 of FIGURE 2.

FIGURE 2 is a bottom plan view of the present invention taken generally on the line 2—2 of FIGURE 1.

FIGURE 3 is an end view of the present invention taken generally on the line 3—3 of FIGURE 2.

FIGURE 4 is a transverse sectional view of the present invention taken on the line 4—4 of FIGURE 2.

FIGURE 5 is a fragmentary perspective view illustrating the deodorizer of the present invention mounted on the dash panel of a vehicle.

FIGURE 6 is a fragmentary perspective view showing the cartridge and its associated parts removed and separated from the housing.

Referring in detail to the drawings, the numeral 10 indicates a portion of a conventional vehicle such as an automobile, FIGURE 5, and the vehicle 10 includes the usual dash panel 11 as well as the front windows 12, and vent windows 20 of conventional construction are arranged contiguous to and forwardly of the main front windows 12. The numeral 13 indicates the usual steering wheel for the vehicle 10, and according to the present invention there has been provided a deodorizer which is indicated generally by the numeral 14, and the deodorizer 14 is adapted to be conveniently supported on the dash 11 of the vehicle, and the deodorizer 14 is adapted to be held in place by magnets 21 which may be suitably affixed to the bottom walls 17 of the housing 15.

It is to be noted that the deodorizer 14 includes a generally hollow housing 15, and the housing 15 is shaped to include horizontally disposed spaced parallel top and bottom walls 16 and 17, a straight back wall 18, and a front wall 19, and the front wall 19 is slightly longer than the back wall 18.

The front wall 19 of the housing 15 is shaped to include angularly arranged portions 22 that meet at the point 23, and the front wall 19 is provided with a plurality of spaced apart apertures 24 therein for the egress there through of scented air, as later described in this application.

There is further provided a wall member which is indicated generally by the numeral 25, and the wall member 25 includes flat end sections 26 as well as inwardly disposed arcuate sections 27 which meet at a intermediate sharp edge portion 28, FIGURE 1.

The housing 15 further embodies a pair of spaced apart end walls 29, and the end walls 29 are shaped to include generally flat sections 30 which merge into outwardly flaring sections 31, and the sections 31 terminate in arcuate portions 32, and as shown in the drawings the arcuate portions 32 are spaced from each other, and these arcuate portions 32 are arranged forwardly of the arcuate sections 27 of the wall member 25 whereby air inlet passageways 33 are defined or provided.

The bottom wall 17 of the housing 15 is provided with a circular opening 34, and the numeral 35 indicates a circular plate or base which registers with the opening 34. A plurality of spring members 36 are affixed to the outer peripheral portions of the base 35, and with the parts arranged as shown in FIGURE 4, for example, the spring members 36 will engage adjacent end portions of the bottom wall 17 so as to maintain the parts in their proper assembled position. However, by applying sufficient manual pressure to the base 35, the holding power of the spring members 36 can be overcome so that the base 35 can be disengaged or disconnected from the deodorizer, as for example when the cartridge 37 is to be replaced.

The cartridge 37 is mounted on a plurality of upwardly disposed pointed prongs or pins 38 which are affixed to the base 35, and as shown in FIGURE 1 for example the cartridge 37 is spaced rearwardly of the intermediate portion 23 of the front wall 19, and the cartridge 37 is interposed between the pair of arcuate portions 32 of the end walls 29.

From the foregoing, it is apparent that there has been provided a deodorizer which is especially for use in a vehicle such as an automobile and with the parts arranged as shown in the drawings, and in particular as shown in FIGURE 5, it will be seen that the deodorizer 14 of the present invention is adapted to be supported on the usual dash panel 11 of a vehicle such as the automobile 10, and the magnets 21 which are suitably affixed to the bottom of the housing will serve to maintain the deodorizer in the desired position on the dash panel 11. With the deodorizer 14 arranged as shown in FIGURE 5 for example, it will be seen that air can enter the interior of the vehicle 10, as for example such air may enter through the vent windows 20 when the vent windows 20 are open, and this air will have a tendency to follow the natural contour of the vehicle around the inner surface of the vehicle adjacent to the inside of the front windshield of the vehicle and this air will have a tendency by natural convection to enter the passageways 33 of the housing 15. This air will then flow through the spaces between the portions 32 and 27 as for example as shown by the arrows in FIGURE 1, and this air will come in contact with the cartridge 37 and the cartridge 37 has a composition such that odors, impurities or the like in the air will be counteracted by the cartridge and this air will then have a tendency to flow out through the apertures or openings 24 whereby the air which is discharged through the openings 24 and into the interior of the vehicle will be perfumed, scented, or otherwise treated to render the air more pleasant and sanitary. The walls such as the walls 29, 25, and 19 are constructed and arranged so that the air will have a tendency to enter the housing through the openings or passageways 33 and leave the air through the apertures 24, and during this movement or flow of air through the housing, the air will come in contact with the cartridge 37 whereby the air will be treated or purified so as to render the air more clean or pleasant smelling.

The parts can be made of any suitable material and in different shapes or sizes.

The present invention is thus a deodorizer which is adapted to be used for perfuming the air and counteracting common odors such as tobacco smoke, gasoline fumes, odors from food stuff, and the like, and the device is held in place on the dash panel of the automobile by the two magnets 21.

The device operates according to the following principle.

Air comes through the vent windows of the vehicle and into the two channels or passageways 33, and this air passes through to the enclosed space that contains the cartridge 37, and the cartridge 37 may be a perfume-concentrated ceramic cartridge around which the air circulates, and this air then flows out through the perforations or apertures 24 in the front of the housing whereby perfumed air will be dispensed into the automobile. The cartridge 37 is held in place by means of the prongs 38, and this cartridge 37 can be replaced when desired or required, the base 35 being provided with the spring members 36 whereby the base will be held in its proper location in the housing.

Minor changes in shape, size and rearrangement of details coming within the field of invention claimed, may be resorted to in actual practice, if desired.

What is claimed is:

In a deodorizer, a housing including horizontally disposed spaced parallel top and bottom walls, magnets connected to said bottom wall, said housing further including vertically disposed spaced apart front and back walls, said back wall being generally straight, said front wall being longer than said back wall, said front wall being shaped to include portions that are arranged angularly with respect to each other, there being a plurality of spaced apart apertures in said front wall, a wall member arranged in said housing adjacent said back wall, and said wall member including flat end sections and inwardly disposed arcuate sections that meet at an intermediate sharp edge portion; said housing further including end walls and each of said end walls embodying a generally flat section which merges into an outwardly flaring section, said flaring section merging into an arcuate portion, the arcuate portions of the end walls being spaced forwardly of the arcuate sections of the wall member whereby air passageways are defined therebetween, there being an opening in the bottom wall of said housing, a circular base arranged adjacent the opening in said bottom wall, upwardly disposed spring members affixed to said base for engaging the bottom wall of the housing, a plurality of upwardly directed pointed prongs affixed to said base, and a cartridge connected to said prongs, said cartridge being spaced rearwardly of the intermediate portion of the front wall, and said cartridge being interposed between the arcuate portions of the end walls.

References Cited in the file of this patent
UNITED STATES PATENTS 2,708,595     Ludwig _____ May 17, 1955
2,718,432     Haduchek _____ Sept. 20, 1955